US010968971B2

(12) United States Patent
Herrmann et al.

(10) Patent No.: US 10,968,971 B2
(45) Date of Patent: Apr. 6, 2021

(54) MULTI-LAYER INSULATOR FOR BRAKE PISTON

(71) Applicant: GOODRICH CORPORATION, Charlotte, NC (US)

(72) Inventors: Nathaniel J. Herrmann, Springfield, OH (US); John A. Stevenson, Beavercreek, OH (US); Scott Whittle, Springboro, OH (US)

(73) Assignee: Goodrich Corporation, Charlotte, NC (US)

(*) Notice: Subject to any disclaimer, the term of this patent is extended or adjusted under 35 U.S.C. 154(b) by 31 days.

(21) Appl. No.: 16/102,232

(22) Filed: Aug. 13, 2018

(65) Prior Publication Data

US 2020/0049216 A1 Feb. 13, 2020

(51) Int. Cl.
| | |
|---|---|
| *F16D 65/84* | (2006.01) |
| *B64C 25/44* | (2006.01) |
| *F16D 55/40* | (2006.01) |
| *F16D 55/00* | (2006.01) |
| *F16D 65/78* | (2006.01) |
| *F16D 69/00* | (2006.01) |

(52) U.S. Cl.
CPC .............. *F16D 65/84* (2013.01); *B64C 25/44* (2013.01); *F16D 55/40* (2013.01); *F16D 2055/0058* (2013.01); *F16D 2065/785* (2013.01); *F16D 2069/006* (2013.01)

(58) Field of Classification Search
CPC ........... F16D 2065/785; F16D 2125/06; F16D 65/84; F16D 2055/0058; F16D 2121/02; F16D 2069/006; F16D 65/78; B64C 25/44

See application file for complete search history.

(56) References Cited

U.S. PATENT DOCUMENTS

| | | | | |
|---|---|---|---|---|
| 3,010,543 | A | | 11/1961 | Pear, Jr. |
| 3,995,721 | A | | 12/1976 | Chambers |
| 4,085,828 | A | * | 4/1978 | Thioux ................. F16D 55/227 188/264 AA |
| 4,147,241 | A | * | 4/1979 | Preniczny ............... B64C 25/44 188/264 G |
| 4,180,147 | A | * | 12/1979 | Tjarksen ............... F16D 65/543 188/196 P |

(Continued)

FOREIGN PATENT DOCUMENTS

| | | |
|---|---|---|
| DE | 202010009547 | 9/2010 |
| FR | 2344751 | 10/1977 |

(Continued)

OTHER PUBLICATIONS

European Patent Office, European Search Report dated Jan. 17, 2020 in Application No. 19191316.9.

*Primary Examiner* — Bradley T King
*Assistant Examiner* — Mahbubur Rashid
(74) *Attorney, Agent, or Firm* — Snell & Wilmer L.L.P.

(57) ABSTRACT

A piston assembly for a multi-disk system may comprise an adjustor sleeve and a piston configured to telescope relative to the adjustor sleeve. A puck may be located at an end of the piston. The piston assembly may include a multi-layer insulator. The multi-layer insulator may comprise a first insulator layer contacting the puck or the piston, and a second insulator layer contacting the first insulator layer. The first and second insulator layers may each comprise a solid disk.

12 Claims, 7 Drawing Sheets

(56) References Cited

U.S. PATENT DOCUMENTS

| | | | | |
|---|---|---|---|---|
| 4,401,012 A * | 8/1983 | Emmett | F16D 65/14 | 188/264 G |
| 4,449,447 A * | 5/1984 | Yanagi | B29C 70/68 | 188/264 G |
| 4,537,289 A * | 8/1985 | VonGrunberg | F16D 65/0979 | 188/264 G |
| 4,603,760 A | 8/1986 | Myers | | |
| 4,742,759 A * | 5/1988 | Hayakawa | F02F 7/0087 | 92/176 |
| 4,747,340 A * | 5/1988 | Schellmann | F02F 3/0015 | 92/172 |
| 4,798,270 A * | 1/1989 | Schneider | F16D 65/84 | 188/264 G |
| 4,848,291 A * | 7/1989 | Kawamura | F02B 77/11 | 123/193.6 |
| 5,205,382 A * | 4/1993 | Edmisten | B64C 25/42 | 188/196 R |
| 5,538,109 A * | 7/1996 | Swank | F16D 55/40 | 188/264 G |
| 5,553,689 A * | 9/1996 | Chareire | F16D 55/40 | 188/217 |
| 5,575,358 A * | 11/1996 | McCormick | F16D 65/14 | 188/264 G |
| 5,713,435 A * | 2/1998 | Schneider | F16D 65/14 | 188/264 G |
| 5,988,044 A * | 11/1999 | Meyer | F16J 1/01 | 188/264 G |
| 6,146,727 A * | 11/2000 | Dannels | B29C 43/183 | 188/264 G |
| 6,401,596 B1 * | 6/2002 | Mashford | F16D 65/0006 | 188/264 G |
| 7,344,006 B2 * | 3/2008 | Edmisten | F16D 55/36 | 188/206 R |
| 8,348,025 B2 * | 1/2013 | Arbesman | F16D 65/0006 | 188/264 G |
| 8,757,332 B2 | 6/2014 | Keahey et al. | | |
| 8,863,915 B2 * | 10/2014 | Adams | F16D 65/0006 | 188/264 G |
| 2010/0314206 A1 | 12/2010 | Quaggio et al. | | |

FOREIGN PATENT DOCUMENTS

| | | | | |
|---|---|---|---|---|
| GB | 1519647 A | * | 8/1978 | F02B 23/0603 |
| GB | 2006934 | | 5/1979 | |
| JP | 2015025550 A | * | 2/2015 | |

* cited by examiner

MULTI-LAYER INSULATOR FOR BRAKE PISTON

FIELD

The present disclosure relates to aircraft braking systems and, in particular, to multi-layer insulators for piston assemblies of braking systems.

BACKGROUND

Aircraft brake systems typically employ a series of friction disks, known collectively as a heat sink, that may be forced into contact with one another to stop the aircraft. The brake systems generally include one or more pistons configured to force the friction disks of the heat sink into contact with one another. During braking, heat may be transferred from the heat sink through the piston and into the brake fluid.

SUMMARY

A piston assembly for a multi-disk system is disclosed herein. In accordance with various embodiments, the piston assembly may comprise an adjustor sleeve and a piston configured to telescope relative to the adjustor sleeve. A puck may be located proximate a proximal end of the piston. A multi-layer insulator may be located over a surface of the puck opposite the piston. The multi-layer insulator may comprise a first insulator layer contacting the surface of the puck and comprising a first solid disk, and a second insulator layer contacting the first insulator layer and comprising a second solid disk.

In various embodiments, the first solid disk may comprise a first inner circumferential surface, a first outer circumferential surface, a first distal surface extending between the first inner circumferential surface and the first outer circumferential surface, and a first proximal surface oriented away from the first distal surface and extending between the first inner circumferential surface and the first outer circumferential surface. The second solid disk may comprise a second inner circumferential surface, a second outer circumferential surface, a second distal surface extending between the second inner circumferential surface and the second outer circumferential surface, and a second proximal surface oriented away from the second distal surface and extending between the second inner circumferential surface and the second outer circumferential surface.

In various embodiments, a first portion of the first proximal surface may be contacting the second distal surface, and a second portion of the first proximal surface may be located axially apart from the second distal surface. In various embodiments, at least one of the first proximal surface or the second distal surface may comprise a plurality of axially extending surface features.

In various embodiments, the multi-layer insulator may further comprise a cover plate located over a proximal surface of the second insulator layer opposite the puck. In various embodiments, an axially extending flange of the cover plate may be located radially outward of the first insulator layer and the second insulator layer. The axially extending flange may contact the puck.

In various embodiments, an axial thickness of the cover plate may be equal to at least one of an axial thickness of the first insulator layer or an axial thickness of the second insulator layer. In various embodiments, the cover plate may comprise a plurality of axially extending surface features.

A multi-disk system is also disclosed herein. In accordance with various embodiments, the multi-disk system may comprise a friction disk and a piston assembly configured to apply a force to the friction disk. The piston assembly may comprise a piston configured to translate toward the friction disk, a puck located between the piston and the friction disk, a first insulator layer contacting at least one of the puck or the piston, and a second insulator layer contacting the first insulator layer. The first insulator layer and the second insulator layer may each comprise a solid disk.

In various embodiments, at least one of the first insulator layer or the second insulator layer may comprise a plurality of axially extending surface features.

In various embodiments, the first insulator layer may comprise a plurality of first surface features extending from a first surface of the first insulator layer, and the second insulator layer may comprise a plurality of second surface features extending from a second surface of the second insulator layer. In various embodiments, the first surface of the first insulator layer may be oriented toward the second surface of the second insulator layer.

In various embodiments, the first insulator layer and the second insulator layer may be located between a first portion of the piston and a second portion of the piston.

In various embodiments, the piston assembly may further comprise a cover plate located between the second insulator layer and the friction disk. In various embodiments, the cover plate may comprise a plurality of axially extending surface features.

In various embodiments, the first insulator layer and the second insulator layer may be located between the piston and the puck.

A multi-layer insulator for a piston assembly is also disclosed herein. In accordance with various embodiments, the multi-layer insulator may comprise a first insulator layer comprising a first solid disk, and a second insulator layer contacting the first insulator layer and comprising a second solid disk. A cover plate may be located over a surface of the second insulator layer opposite the first insulator layer. The cover plate may comprise a flange extending axially from an outer circumference of the cover plate.

In various embodiments, the first solid disk and the second solid disk may each comprise an inner circumferential surface, an outer circumferential surface, a distal surface extending between the inner circumferential surface and the outer circumferential surface, and a proximal surface oriented away from the distal surface and extending between the inner circumferential surface and the outer circumferential surface.

In various embodiments, a first portion of the proximal surface of the first insulator layer may be contacting the distal surface of the second insulator layer, and a second portion of the proximal surface of the first insulator layer may be located axially apart from the distal surface of the second insulator layer. In various embodiments, the cover plate may comprise a plurality of surface features.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option(s). Additionally, any reference to without contact (or similar phrases) may also include reduced contact or minimal contact.

Throughout the present disclosure, like reference numbers denote like elements. Accordingly, elements with like element numbering may be shown in the figures, but may not necessarily be repeated herein for the sake of clarity. Cross hatching lines may be used throughout the figures to denote different parts, but not necessarily to denote the same or different materials.

As used herein, "distal" refers to the direction axially outward, or generally, away from the friction disks of a multi-disk system. As used herein, "proximal" refers to a direction axially inward, or generally, towards the friction disks of a multi-disk system. In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. A first component that is radially inward of a second component rotates through a circumferentially shorter path than the second component.

Multi-disk systems of the present disclosure may include a plurality of friction disks and a piston assembly configured to force the friction disks into contact with one another. In various embodiments, the piston assembly includes a multi-layer insulator. The multi-layer insulator may reduce thermal conductance from the frictions disks to brake fluid within the piston assembly.

Figure 1:
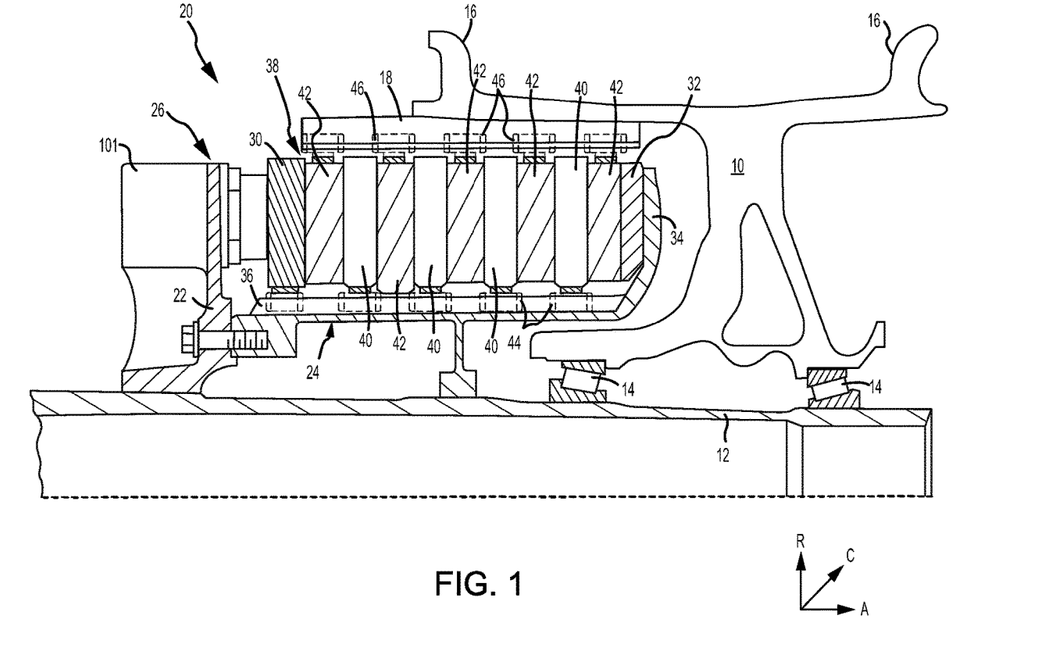
FIG. 1 illustrates a multi-disk brake system, in accordance with various embodiments.

Referring to FIG. 1, a multi-disk brake system 20 is illustrated according to various embodiments. Multi-disk brake system 20 may modulate rotation of a wheel 10. Wheel 10 includes rims 16 for supporting a tire, and a series of axially extending rotor splines 18 (one shown). Wheel 10 is supported for rotation about an axle 12 by bearings 14. Axle 12 defines an axis of multi-disk brake system 20 and the various components thereof. Any reference to the terms axis and axial may include an axis of rotation defined by axle 12 or a dimension parallel to such axis. Axle 12 is oriented in the A direction (i.e., axial direction) on the provided ARC axes. The R direction on the provided ARC axes refers to a radial direction and the C direction on the provided ARC axes refers to a circumferential direction.

Rotation of wheel 10 is modulated by multi-disk brake system 20. Multi-disk brake system 20 includes torque flange 22, torque tube 24, a plurality of piston assemblies 26 (one shown), pressure plate 30, and end plate 32. Torque tube 24 may be an elongated annular structure that includes a reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. The plurality of friction disks 38 includes at least one non-rotatable friction disk (stator) 40, and at least one rotatable friction disk (rotor) 42. Friction disks 38 may each include an attachment structure. For example, stators 40 include a plurality of stator lugs 44 at circumferentially spaced positions around an inner circumference of stators 40, and rotors 42 include a plurality of rotor lugs 46 at circumferentially spaced positions around an outer circumference of rotors 42.

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10 (i.e. towards friction disks 38). End plate 32 is non-rotatable by virtue of its connection to torque tube 24. Stator splines 36 may support pressure plate 30 such that pressure plate 30 is also non-rotatable. Stator splines 36 also support stators 40. Stators 40 engage stator splines 36 with gaps formed between stator lugs 44. Similarly, rotors 42 engage rotor splines 18 with gaps formed between rotor lugs 46. Thus, rotors 42 are rotatable by virtue of their engagement with rotor splines 18 of wheel 10.

In various embodiments, rotors 42 are arranged with end plate 32 on one end, pressure plate 30 on the other end, and stators 40 interleaved such that rotors 42 are adjacent to non-rotatable friction components. Piston assemblies 26 are connected to torque flange 22 at circumferentially spaced positions around torque flange 22. Piston assemblies 26 face axially toward wheel 10 and contact a side of pressure plate 30 opposite rotors 42. Piston assemblies 26 may be powered mechanically, electrically, hydraulically, or pneumatically. Piston assemblies 26 are configured to exert a force on friction disks 38 towards reaction plate 34. Actuation of piston assemblies 26 causes rotors 42 and stators 40 to be pressed together between pressure plate 30 and end plate 32. While piston assemblies 26 are shown as part of a multi-disk brake system 20, it is further contemplated and understood that the piston assemblies, as disclosed herein, may be employed in a variety of other multi-disk systems. For example, piston assemblies 26 may be employed in a multi-disk clutch system. As such, numerous applications of the present disclosure may be realized.

Figure 2A:
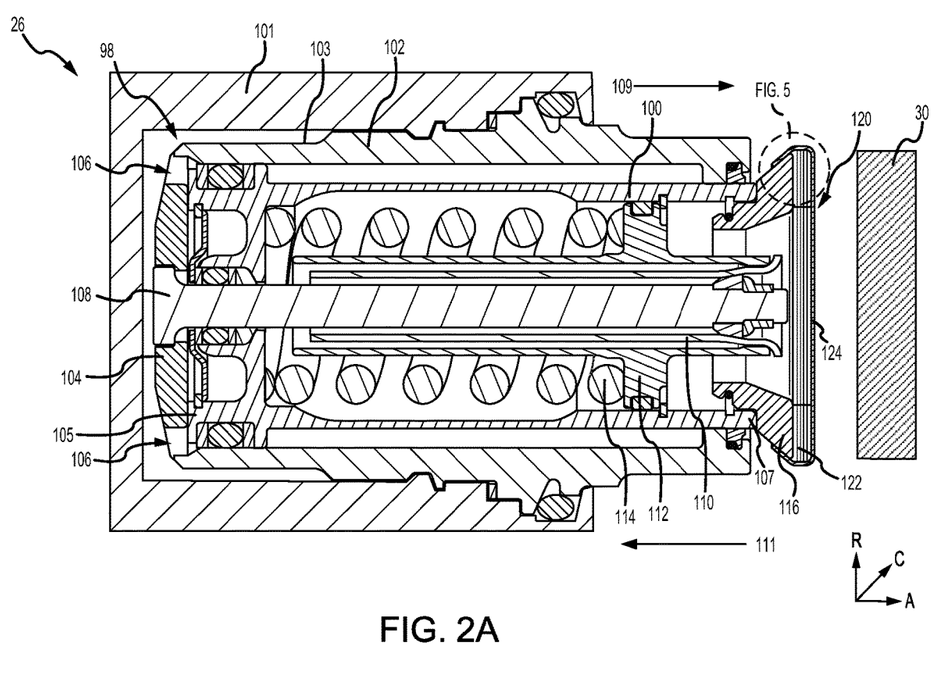
FIGS. 2A and 2B illustrate, respectively, a section view and a perspective section view of a piston assembly having a multi-layer insulator, in accordance with various embodiments.

Referring to FIG. 2A, and with continued reference to FIG. 1, additional details of a piston assembly 26 are illustrated, in accordance with various embodiments. Piston assembly 26 includes a piston 100 configured to translate axially within an adjustor sleeve 102. Piston 100 may telescope relative to adjustor sleeve 102. In various embodiments, adjustor sleeve 102 is located within a piston housing 101 of piston assembly 26. In various embodiments, an external, or radially outward, surface 103 of adjustor sleeve 102 may define threads configured to engage threads within piston housing 101 and secure adjustor sleeve 102 to piston housing 101. A brake or working fluid (e.g., hydraulic fluid) may be contained in a volume 98 defined, at least partially, by external surface 103 of adjustor sleeve 102 and by piston housing 101.

In various embodiments, piston assembly 26 further includes an adjustor pin retainer 104 located at a distal end 105 of piston 100. Distal end 105 is oriented generally opposite, or away from, pressure plate 30. Adjustor pin retainer 104 may define one or more orifices 106. During braking, brake fluid located between external surface 103 and piston housing 101 may be forced through orifices 106 (i.e., between adjustor pin retainer 104 and piston 100), thereby causing piston 100 to translate toward pressure plate 30 (i.e., in the direction of arrow 109) and force friction disks 38 into contact with one another. Piston 100 may translate away from pressure plate 30 (i.e., in the direction of arrow 111) by forcing the brake fluid located between adjustor pin retainer 104 and piston 100 to flow out orifices 106 and into volume 98 between external surface 103 and piston housing 101.

An adjustor pin 108 may be coupled to adjustor pin retainer 104. Adjustor pin 108 extends axially through piston 100. An adjustor tube 110 is located radially outward of adjustor pin 108. A spring guide 112 is located radially outward of adjustor tube 110. An adjustor spring 114 is located radially outward of spring guide 112, between a radially inward facing surface of piston 100 and spring guide 112.

Piston assembly 26 further includes a puck 116 located at a proximal end 107 of piston 100. Proximal end 107 is oriented generally towards pressure plate 30. Stated differently, proximal end 107 of piston 100 is located axially opposite distal end 105 of piston 100. Puck 116 is configured to translate with piston 100. In this regard, a change in hydraulic pressure, leading to a change in the volume of fluid between adjustor pin retainer 104 and piston 100, may cause an actuation of piston 100, which causes puck 116 to translate axially toward or away from pressure plate 30 and friction disks 38.

Figure 2B:
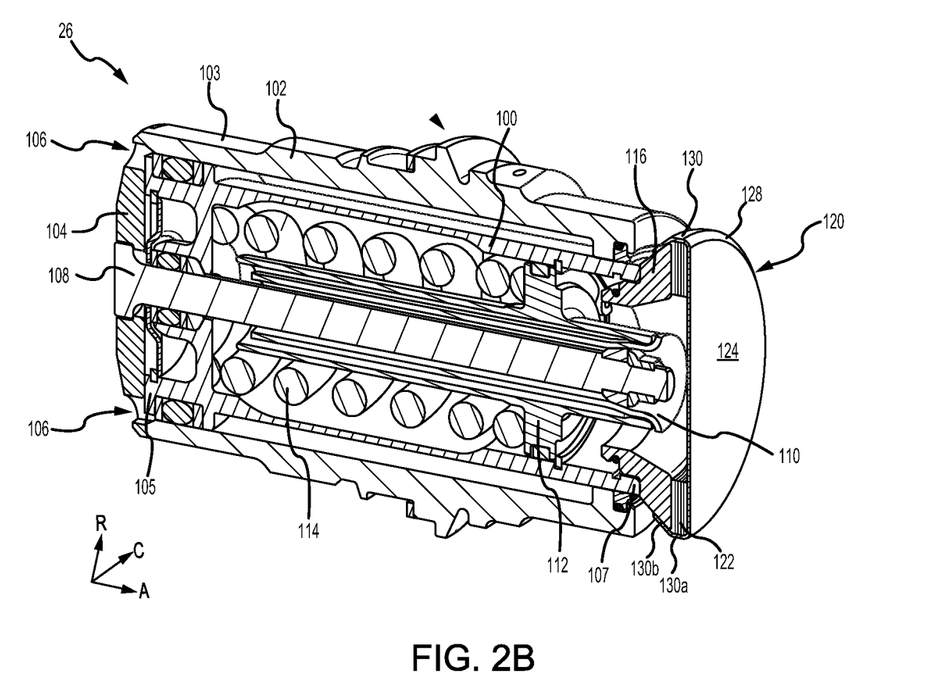

Referring to FIG. 2B, and with continued reference to FIG. 1 and FIG. 2A, in accordance with various embodiments, piston assembly 26 further includes a multi-layer insulator 120 coupled to puck 116. Multi-layer insulator 120 may be located between puck 116 and pressure plate 30. During braking, heat is generated by friction disks 38 and/or pressure plate 30 and friction disks 38. As discussed in further detail below, multi-layer insulator 120 may provide thermal insulation between pressure plate 30 and puck 116, thereby reducing transmission of thermal energy (i.e., heat) from pressure plate 30 and friction disks 38 to piston 100 and the brake fluid within piston assembly 26.

Multi-layer insulator 120 includes a plurality of insulator layers 122 and a cover plate 124 located over the insulator layers 122. Cover plate 124 may be configured to secure insulator layers 122 to puck 116. In this regard, cover plate 124 may include a flange 130. Flange 130 may extend axially from an outer circumference 128 of cover plate 124. A first portion 130a of flange may be located radially outward of an outer circumferential surface of insulator layers 122. A second portion 130b of flange may extend axially and radially inward from first portion 130a. Second portion 130b may contact and follow a contour of a radially outward surface of puck 116.

In various embodiments, insulator layers 122 and cover plate 124 may be a metal or metal alloy. For example, insulator layers 122 and cover plate 124 may include stainless steel, aluminum, titanium, nickel, and/or alloys thereof. In various embodiments, insulator layers 122 and cover plate 124 may include a carbon composite material, a ceramic, and/or a thermoplastic material. In various embodiments, insulator layers 122 and cover plate 124 may include a carbon composite material configured to reduce thermal conduction in the axial direction, for example, a thermal conductivity of the carbon composite material in the axial direction may be less than a thermal conductivity of the carbon composite material in the radial direction. In various embodiments, cover plate 124 may comprise a material different from the material of insulator layers 122. For example, insulator layers 122 may comprise a metal and cover plate 124 may comprise a carbon composite material.

Figure 3:
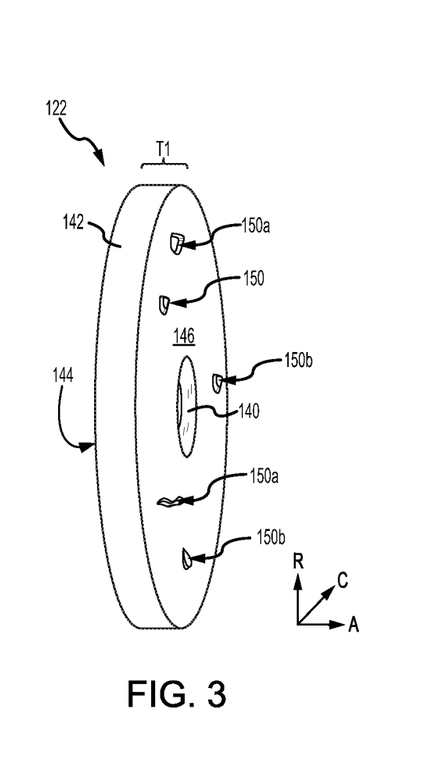
FIG. 3 illustrates a solid disk insulator layer for a piston assembly, in accordance with various embodiments.

With reference to FIG. 3, an insulator layer 122 is illustrated in accordance with various embodiments. Insulator layer 122 includes an inner circumferential surface 140 and an outer circumferential surface 142. Inner circumferential surface 140 is oriented radially inward. Outer circumferential surface 142 is oriented radially outward and generally opposite inner circumferential surface 140. Each insulator layer 122 further includes a distal surface 144 and a proximal surface 146 extending radially from inner circumferential surface 140 to outer circumferential surface 142. Distal surface 144 is oriented away from friction disks 38 (FIG. 1). Proximal surface 146 is oriented away from distal surface 144 and toward friction disks 38. Insulator layers 122 each comprise solid disks. As used herein "solid disks" means that the material of insulator layers 122 extends continuously from inner circumferential surface 140 to outer circumferential surface 142 and from distal surface 144 to proximal surface 146. Stated differently, between inner circumferential surface 140 and outer circumferential surface 142 there are no channels or other openings extending from distal surface 144 to proximal surface 146, and between distal surface 144 and proximal surface 146 there are no channels or other openings extending from inner circumferential surface 140 to outer circumferential surface 142.

Distal surface 144 and proximal surface 146 each include various surface feature asperities 150, for example, grooves 150a and projections 150b. An axial thickness of insulator layer 122 varies at the asperities 150, such that the axial thickness of insulator layer 122 at a groove 150a is less than an axial thickness T1 from distal surface 144 to proximal surface 146, and the axial thickness of insulator layer 122 at a projection 150b is greater than the axial thickness T1 from distal surface 144 to proximal surface 146.

Figure 4:
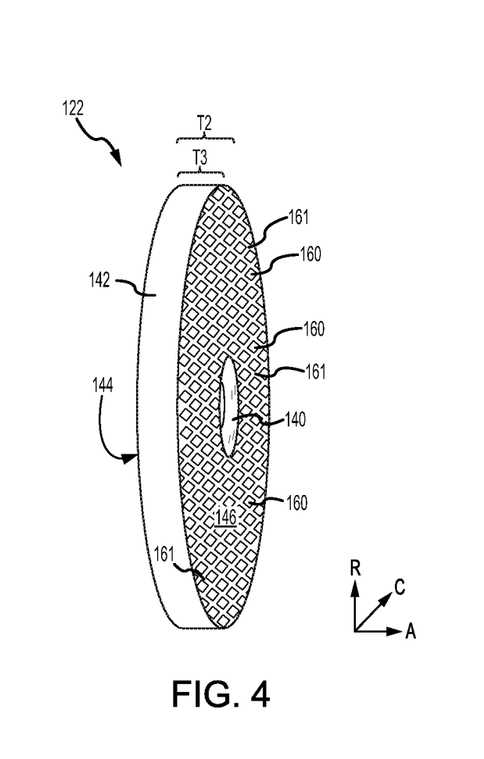
FIG. 4 illustrates a solid disk insulator layer having surface features for a piston assembly, in accordance with various embodiments.

With reference to FIG. 4, in various embodiments, insulator layer 122 may include a plurality of axially extending surface features 160. Surface features 160 may extend (i.e., protrude) from proximal surface 146. Surface features 160 may be formed by cutting, pressing, rolling, 3D printing, or otherwise forming a pattern of straight, angle, or crossed indentations 161 (i.e., grooves) into insulator layer 122, thereby forming raised, or protruding, surface features 160 between indentations 161. Surface features 160 may also be formed over distal surface 144. In various embodiments, surface features 160 may have a generally pyramid, or frustopyramidal shape. The axial thickness of insulator layer 122 varies at surface features 160, such that an axial thickness T2 of insulator layer 122 at a surface feature 160 is greater than the axial thickness T3 at indentations 161.

Figure 5:
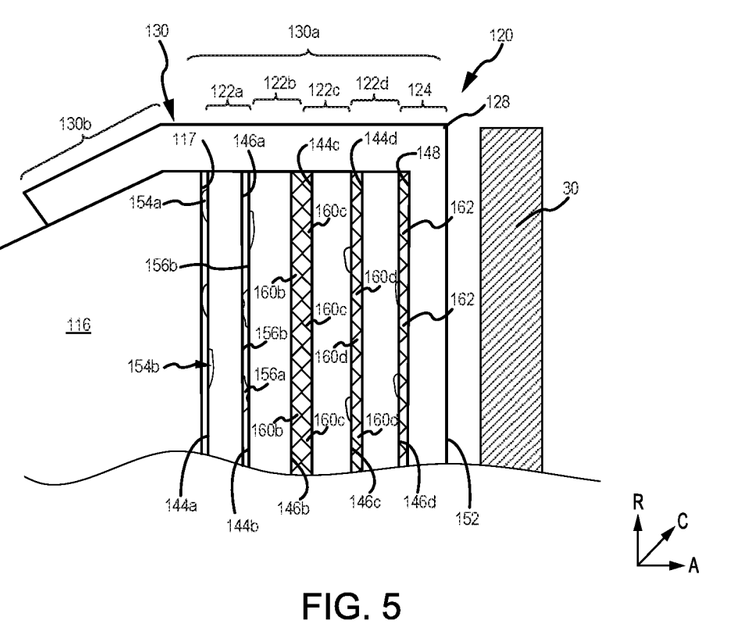
FIG. 5 illustrates a portion of the multi-layer insulator of FIG. 2A, in accordance with various embodiments.

With reference to FIG. 5, surface feature asperities 150 and/or surface features 160 may cause a reduction in thermal contact area and an increase in thermal contact resistance to develop at the interface between adjacent layers of multi-layer insulator 120, as each insulator layer 122 is generally contacting the adjacent insulator layer 122 (or puck 116 or cover plate 124) at the areas of greatest axial thickness. For example, a first portion 154a of distal surface 144a of insulator layer is contacting a proximal surface 117 of puck 116, while a second portion 154b of distal surface 144a is located axially apart from proximal surface 117 of puck 116. A first portion 156a of proximal surface 146a of insulator layer 122a is contacting distal surface 144b of adjacent insulator layer 122b, and a second portion 156b of proximal surface 146a is located axially apart from distal surface 144b.

Proximal surface 146b of insulator layer 122b includes axially extending surface features 160b, and distal surface 144c of insulator layer 122c includes axially extending surface features 160c. Surface features 160b may extend towards insulator layer 122c and may contact surface features 160c and/or distal surface 144c. Surface features 160c may extend towards insulator layer 122b and may contact surface features 160b and/or proximal surface 146b. Distal surface 144d may include axially extending surface features 160d. Surface features 160d may extend towards insulator layer 122c and may contact proximal surface 146c, while distal surface 144d is axially separated from proximal surface 146c. In various embodiments, a distal surface 148 of cover plate may include axial extending surface features 162. Surface features 162 may extend towards insulator layer 122d and may contact proximal surface 146d. In various embodiments, an axial thickness, extending from distal surface 148 to proximal surface 152, of cover plate is approximately equal to the axial thickness T1, with momentary reference to FIG. 3, extending from distal surface 144 to proximal surface 146 of insulator layers 122.

While surface features are illustrated as extending from proximal surface 146b and distal surfaces 144c, 144d and 148, it is further contemplated and understood that the distal surface 144 and/or proximal surface 146 of any insulator layer 122, the distal surface 148 and/or proximal surface 152 of cover plate 124, and/or the proximal surface 117 of puck 116 may include axially extending surface features.

Varying axial thickness of insulator layers 122 and thus limiting or reducing the contact interfaces between adjacent insulator layers 122 (i.e., the areas where one insulator layer 122 is in direct contact with an adjacent insulator layer 122) may reduce thermal contact area and increase thermal contact resistance through multi-layer insulator 120, which reduces thermal conductance from friction disks 38 to piston 100 and into the brake fluid. Multi-layer insulator 120 may thus reduce brake fluid temperatures. The number of insulator layers 122, the axial thickness of each insulator layer 122, and surface finish (e.g., axially extending surface features) of each insulator layer 122 may be tuned to meet various fluid temperature requirements. For example, thermal conductance may be reduced by increasing the number of insulator layers 122 (and thus creating a greater number of contact interfaces) within multi-layer insulator 120. The number of insulator layers 122 may be increased by reducing the axial thickness of each insulator layer 122.

Figure 6:
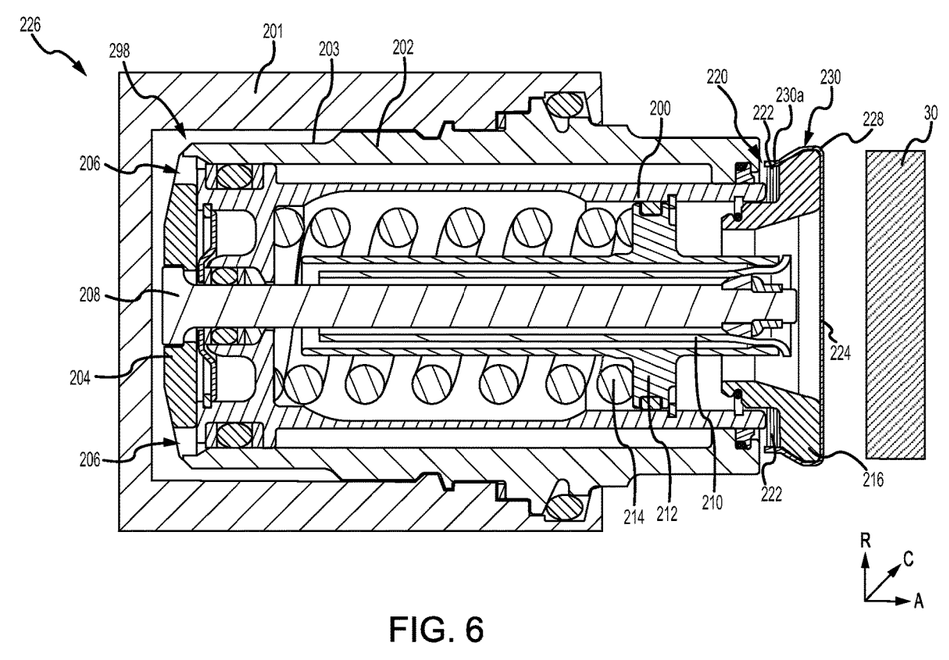
FIG. 6 illustrates a section view of a piston assembly having insulator layers of a multi-layer insulator located between a puck and a piston of the piston assembly.

Referring to FIG. 6, a piston assembly 226 including a multi-layer insulator 220 is illustrated, in accordance with various embodiments. In various embodiments, piston assembly 226 may be employed in multi-disk brake system 20 of FIG. 1. Piston assembly 226 includes a piston 200 configured to translate axially within an adjustor sleeve 202. Piston 200 may telescope relative to adjustor sleeve 202. Adjustor sleeve 202 is located within a piston housing 201. In various embodiments, a brake or working fluid (e.g., hydraulic fluid) may be contained in a volume 298 defined, at least partially, by an external surface 203 of adjustor sleeve 202 and by piston housing 201.

Piston assembly 226 may further include an adjustor pin retainer 204. Adjustor pin retainer 204 may define one or more orifices 206 through which brake fluid may flow. An adjustor pin 208 may be coupled to adjustor pin retainer 204. An adjustor tube 210 is located radially outward of adjustor pin 208. A spring guide 212 is located radially outward of adjustor tube 210. An adjustor spring 214 is located radially outward of spring guide 212, between spring guide 212 and a radially inward facing surface of piston 200.

In accordance with various embodiments, piston assembly 226 further includes a multi-layer insulator 220. Multi-layer insulator 220 includes a plurality of insulator layers 222 and a cover plate 224. In various embodiments, insulator layers 222 may be located between piston 200 and a puck 216 of piston assembly 226. Cover plate 224 may be located between puck 216 and pressure plate 30. In various embodiments, piston assembly 226 may include insulator layers 222 located between piston 200 and puck 216 and insulator layers located between puck 216 and cover plate 224 (similar to insulator layers 122 in FIG. 2A).

Cover plate 224 may be configured to secure insulator layers 222 to puck 216. In this regard, cover plate 224 may include an axially extending flange 230. Flange 230 may extend axially from an outer circumference 228 of cover plate 224. A first portion 230a of flange 230 may be located radially outward of an outer circumferential surface of insulator layers 222. Insulator layers 222 may each comprise a solid disk having surface feature asperities and/or axially extending surface features, similar to insulator layers 122 in FIGS. 3 and 4. In various embodiments, cover plate 224 may include axially extending surface features, similar to cover plate 124 in FIG. 5. During braking, heat generated by friction disks 38 (FIG. 1) and/or by pressure plate 30 and friction disks 38 is transferred to puck 216. Multi-layer insulator 220 may provide thermal insulation between puck 216 and piston 200, thereby reducing transmission of thermal energy (i.e., heat) from pressure plate 30 and friction disks 38 to piston 200 and the brake fluid within piston assembly 226.

Figure 7:
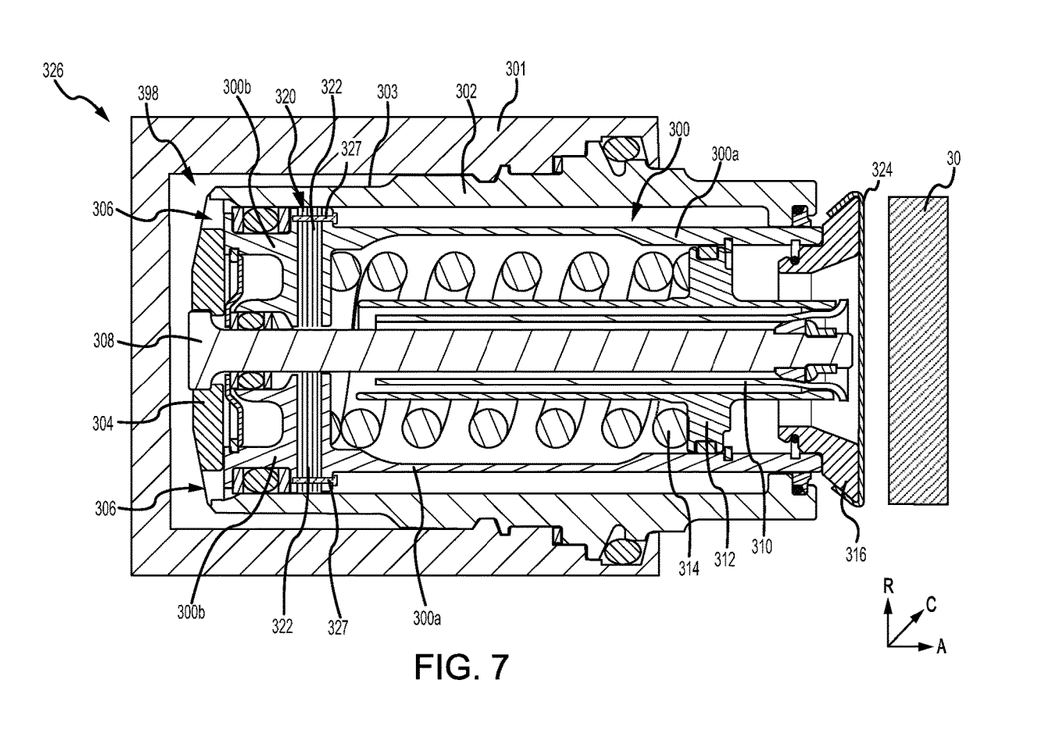
FIG. 7 illustrates a section view of a piston assembly having insulator layers of a multi-layer insulator located between portions of a piston of the piston assembly, in accordance with various embodiments.

Referring to FIG. 7, a piston assembly 326 including a multi-layer insulator 320 is illustrated, in accordance with various embodiments. In various embodiments, piston assembly 326 may be employed in multi-disk brake system 20 of FIG. 1. Piston assembly 326 includes a piston 300 configured to translate axially within an adjustor sleeve 302.

Piston 300 may telescope relative to adjustor sleeve 302. Adjustor sleeve 302 is located within a piston housing 301. In various embodiments, a brake or working fluid (e.g., hydraulic fluid) may be contained in a volume 398 defined, at least partially, by an external surface 303 of adjustor sleeve 302 and by piston housing 301.

Piston assembly 326 may further include an adjustor pin retainer 304. Adjustor pin retainer 304 may define one or more orifices 306 through brake fluid may flow. An adjustor pin 308 may be coupled to adjustor pin retainer 304. An adjustor tube 310 is located radially outward of adjustor pin 308. A spring guide 312 is located radially outward of adjustor tube 310. An adjustor spring 314 is located radially outward of spring guide 312, between spring guide 312 and a radially inward facing surface of piston 300.

In accordance with various embodiments, piston assembly 326 further includes a multi-layer insulator 320. Multi-layer insulator 320 may include a plurality of insulator layers 322 and a cover plate 324. In various embodiments, insulator layers 322 may be located between a first piston portion 300a and a second piston portion 300b of piston 300. First piston portion 300a may be located proximate to and/or in contact with a puck 316 of piston assembly 326. Second piston portion 300b may be distal puck 316 and first piston portion 300a. Second piston portion 300b may be located proximate volume 398 and orifices 306. Stated differently, second piston portion 300b may be located closer to the brake fluid within piston assembly 326, as compared to first piston portion 300a. Stated yet another way, first piston portion 300a may be located between second piston portion 300b and puck 316.

In various embodiments, one or more fastener(s) 326 may secure first piston portion 300a to second piston portion 300b. Fasteners 327 may also extend through insulator layers 322. Fasteners 327 may each include a screw, rivet, nut and bolt, or any other suitable securement device. It is further contemplated and understood that additional and/or other securement methods, for example, welding, retaining rings, press fittings, etc. may be employed to secure insulator layers 322 and first and second piston portions 300a, 300b.

Cover plate 324 may be located between puck 316 and pressure plate 30. In various embodiments, cover plate 324 may include axially extending surface features, similar to cover plate 124 in FIG. 5. In various embodiments, piston assembly 326 may include insulator layers 322 located between first and second piston portions 300a, 300b, insulator layers located between piston 300 and puck 316 (similar to insulator layers 222 in FIG. 6), and/or insulator layers located between puck 316 and cover plate 324 (similar to insulator layers 122 in FIG. 2A).

Insulator layers 322 may each comprise a solid disk having surface feature asperities and/or axially extending surface features, similar to insulator layers 122 in FIGS. 3 and 4. During braking, heat generated by friction disks 38 (FIG. 1) and/or by pressure plate 30 and friction disks 38 is transferred, via puck 316, to first piston portion 300a. Multi-layer insulator 320 may provide thermal insulation between first piston portion 300a and second piston portion 300b, thereby reducing transmission of thermal energy (i.e., heat) from pressure plate 30 and friction disks 38 to second piston portion 300b and the brake fluid within piston assembly 326.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A piston assembly for a multi-disk system, comprising:
   an adjustor sleeve;
   a piston configured to telescope relative to the adjustor sleeve;
   a puck located proximate a proximal end of the piston; and
   a multi-layer insulator located over a surface of the puck opposite the piston, the multi-layer insulator comprising:
   a first insulator layer contacting the surface of the puck and comprising a first outer circumferential surface, a first inner circumferential surface, a first proximal surface extending continuously from the first outer circumferential surface to the first inner circumferential surface, and a first distal surface oriented away from the first proximal surface and extending continuously from the first outer circumferential surface to the first inner circumferential surface, wherein the first insulator layer comprises a first solid disk, and wherein a first material of the first insulator layer extends continuously from the first outer circumferential surface to the first inner circumferential surface and from the first distal surface to the first proximal surface, and wherein the first insulator layer includes a plurality of first protrusions extending axially from the first proximal surface; and a second insulator layer contacting the first insulator layer and comprising a second outer circumferential surface, a second inner circumferential surface, a second proximal surface extending continuously from the second outer circumferential surface to the second inner circumferential surface, and a second distal surface oriented away from the second proximal surface and extending continuously from the second outer circumferential surface to the second inner circumferential surface, wherein the second insulator layer comprises a second solid disk, and wherein a second material of the second insulator layer extends continuously from the second outer circumferential surface to the second inner circumferential surface and from the second distal surface to the second proximal surface, and wherein the second insulator layer includes a plurality of second protrusions extending axially from the second distal surface, and wherein the plurality of first protrusions is contacting the second insulator layer.

2. The piston assembly of claim 1, wherein the multi-layer insulator further comprises a cover plate located over the second proximal surface of the second insulator layer opposite the puck.

3. The piston assembly of claim 2, wherein an axially extending flange of the cover plate is located radially outward of the first insulator layer and the second insulator layer, and wherein the axially extending flange contacts the puck.

4. The piston assembly of claim 2, wherein an axial thickness of the cover plate is equal to at least one of an axial thickness of the first insulator layer or an axial thickness of the second insulator layer.

5. The piston assembly of claim 2, wherein the cover plate comprises a plurality of axially extending surface features.

6. A multi-disk system comprising:
a friction disk; and
a piston assembly configured to apply a force to the friction disk, the piston assembly comprising:
  a piston configured to translate toward the friction disk;
  a puck located between the piston and the friction disk;
  a first insulator layer contacting at least one of the puck or the piston, the first insulator layer comprising a first outer circumferential surface, a first inner circumferential surface, a first proximal surface extending continuously from the first outer circumferential surface to the first inner circumferential surface, and a first distal surface oriented away from the first proximal surface and extending continuously from the first outer circumferential surface to the first inner circumferential surface, wherein the first insulator layer is a first solid disk, and wherein a first material of the first insulator layer extends continuously from the first outer circumferential surface to the first inner circumferential surface and from the first distal surface to the first proximal surface, and wherein the first insulator layer comprises a plurality of first surface features extending from the first proximal surface of the first insulator layer; and a second insulator layer contacting the first insulator layer, the second insulator layer comprising a second outer circumferential surface, a second inner circumferential surface, a second proximal surface extending continuously from the second outer circumferential surface to the second inner circumferential surface, and a second distal surface oriented away from the second proximal surface and extending continuously from the second outer circumferential surface to the second inner circumferential surface, wherein the second insulator layer is a second solid disk, and wherein a second material of the second insulator layer extends continuously from the second outer circumferential surface to the second inner circumferential surface and from the second distal surface to the second proximal surface, and wherein the second insulator layer comprises a plurality of second surface features extending from the second distal surface of the second insulator layer.

7. The multi-disk system of claim 6, wherein at least one of the plurality of first surface features of the first insulator layer is formed by a plurality of first indentations formed in the first proximal surface of the first insulator layer or the plurality of second surface features of the second insulator layer is formed by a plurality of second indentations formed in the second distal surface of the second insulator layer.

8. The multi-disk system of claim 6, wherein the first proximal surface of the first insulator layer is oriented toward the second distal surface of the second insulator layer.

9. The multi-disk system of claim 6, wherein the first insulator layer and the second insulator layer are located between a first portion of the piston and a second portion of the piston.

10. The multi-disk system of claim 6, wherein the piston assembly further comprises a cover plate located between the second insulator layer and the friction disk.

11. The multi-disk system of claim 10, wherein the cover plate comprises a plurality of axially extending surface features.

12. The multi-disk system of claim 6, wherein the first insulator layer and the second insulator layer are located between the puck and the piston.

* * * * *